US005491693A

United States Patent [19]
Britton et al.

[11] Patent Number: 5,491,693
[45] Date of Patent: Feb. 13, 1996

[54] GENERAL TRANSPORT LAYER GATEWAY FOR HETEROGENEOUS NETWORKS

[75] Inventors: Kathryn H. Britton, Chapel Hill, N.C.; Tein-Yaw Chung, Chung-Li, Taiwan; Willibald Doeringer, Langnau; Harold D. Dykeman, Dietikon, both of Switzerland; Allan K. Edwards, Raleigh, N.C.; Johny Mathew, Cary, N.C.; Diane P. Pozefsky, Chapel Hill, N.C.; Soumitra Sarkar, Cary, N.C.; Roger D. Turner, Raleigh, N.C.

[73] Assignee: International Business Machines Corporation, Armonk, N.Y.

[21] Appl. No.: 189,816

[22] Filed: Feb. 1, 1994

Related U.S. Application Data

[63] Continuation-in-part of Ser. No. 175,985, Dec. 30, 1993.
[51] Int. Cl.$^6$ .............................. H04L 12/66; H04L 29/06
[52] U.S. Cl. ...................... 370/85.13; 370/85.14; 370/94.1
[58] Field of Search ................ 370/60, 60.1, 85.13, 370/85.14, 94.1, 94.2, 110.1

[56] References Cited

U.S. PATENT DOCUMENTS 5,235,592  8/1993  Cheng et al. .......................... 370/94.1
5,243,595  9/1993  Woest et al. .......................... 370/94.1
5,251,205  10/1993  Callon et al. .......................... 370/94.1
5,309,437  5/1994  Perlman et al. ....................... 370/94.1

Primary Examiner—Wellington Chin
Attorney, Agent, or Firm—Stephen T. Keohane

[57] ABSTRACT

A multiprotocol transport network (MPTN) gateway provides transparent interconnection of two or more SPTNs running different transport layer protocols to form an integrated heterogeneous MPTN. The MPTN gateway of the present invention has no dependencies on the particular transport protocols running on the SPTNs being interconnected as it utilizes a common transport provider (a Gateway Services Protocol Boundary (GSPB)) between the SPTN transport protocols and the gateway components. The MPTN gateway supports connections between end systems across multiple intermediate networks. The MPTN gateway provides automatic routing based on dynamic participation in the routing protocols of the interconnected SPTNs so that any number of gateways may be interconnected and in any topology desired. As the MPTN gateway has a general architecture and acquires routing information automatically, it supports not only other MPTN nodes and gateways but also non-MPTN nodes and gateways.

27 Claims, 13 Drawing Sheets

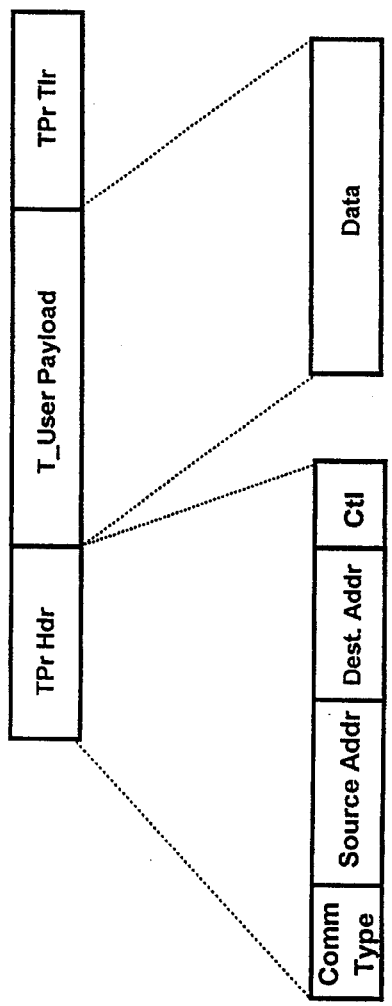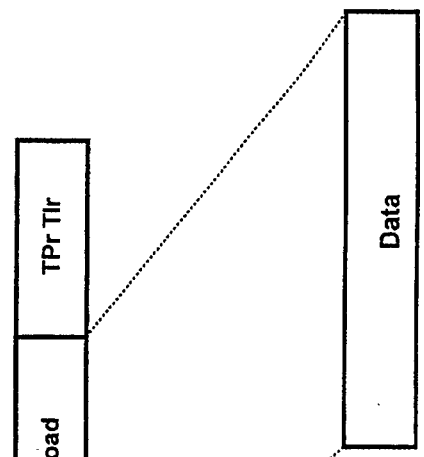

GENERAL TRANSPORT LAYER GATEWAY FOR HETEROGENEOUS NETWORKS

RELATED APPLICATIONS AND PATENTS

This application is a continuation-in-part of U.S. application Ser. No. 08/175,985, entitled "General Transport Layer Gateway for Heterogenerous Networks", filed Oct. 30, 1993.

This application is closely related to our own, commonly assigned U.S. Pat. No. 5,224,098, entitled "Compensation for Mismatched Transport Protocols in a Data Communication Network". The patent describes a Multi-Protocol Transport Networking (MPTN) Architecture which allows an application program running at one node in a network to communicate with a second application program running at another node in the network even where the application programming interface (API) assumes a different set of transport functions than those supported by the transport provider. In particular, it relates to a method for establishing communication, either connectionless or with a connection, between the applications and compensating for transport protocol mismatches, if any.

This application is also related to another one of our own, commonly assigned, copending application Ser. No. 07/915,969, filed Jul. 16, 1992, entitled "Protocol Selection and Address Resolution for Programs Running in Heterogeneous Networks". This copending application relates to address resolution and protocol selection among multiple transport protocols for the applications and the nodes in the MPTN.

This application is further related to another one of our own, commonly assigned, U.S. Pat. No. 5,361,256, issued on Nov. 1, 1994, entitled "Inter-Domain Multicast Routing". This Patent relates to a method of and system for multicasting messages in a complex network that is originally equipped only for unicast transmission.

BACKGROUND OF THE INVENTION

I. Field of the Invention

The present invention relates to data communications and, more particularly, to a gateway which provides transparent interconnection of two or more networks running different protocols.

II. Background and Prior Art

As communications network have evolved, independent suppliers of computer hardware and software developed different, non-compatible formats and protocols for transporting data through the communications networks. Examples of well-known communications protocols include System Network Architecture (SNA), Digital Network Architecture (DECNet), Transmission Control Protocol/Internet Protocol (TCP/IP), NetBIOS and OSI.

As networks have grown, and particularly as local area networks (LANs) have come into widespread use, many organizations have ended up with one or more physical networks that are confederations of one or more logical networks, each logical network running a different networking protocol. (A logical network runs a single networking protocol and is referred to a single protocol transport network, or SPTN. ) For example, a single organization may have dozens of SPTNs running as many as four or five different networking protocols. (Such a physical network having more than one logical networks, or SPTNs, is termed heterogeneous network.) This heterogeneity complicates communications as distributed programs are generally written for a particular application programming interface (API) which assumes a specific networking protocol, and can, therefore, only run on limited parts of the overall physical network.

In a node, if a mismatch exists between the transport protocols (the most basic end-to-end networking protocols for opening and closing connections, sending and receiving data on connections, and sending and receiving datagrams) assumed by the particular API for a company's application program and the transport protocols actually implemented in one or more of the SPTNs on which the company would like to transport the application data, compensation between the API and the transport provider may be required. This is described in greater detail in closely related U.S. Pat. No. 5,224,098.

In addition, there are addressing problems associated with the heterogeneous networks. A program today identifies itself and finds its partners using addresses associated with a particular networking protocol. (A networking protocol uses addresses to locate programs in the SPTN via existing protocol-specific means, such as local directory searches or directory broadcasts, and to route to those programs.) In order for the program to operate over multiple, different networking protocols, such as in a heterogeneous network, a mechanism is needed to bridge the gap between the specific address set used by the program and the address sets used by the networking protocols. In particular, program independence from specific network protocols requires a transport-independent mechanism for finding the source and destination application programs and the corresponding available transport protocols. In addition, a mechanism for selecting the best transport protocol to utilize, when multiple networking protocols are available, is required. This is described in greater detail in closely related patent application Ser. No. 07/915,969.

Where there are a number of SPTNs running different protocols, a gateway provides transparent interconnection of the SPTNs so that a single multiprotocol transport network, or MPTN, is formed. This MPTN appears to the end user applications, as if a single protocol was used throughout the heterogeneous network. Gateways, among other things, provide routing functions in order to enable resources to be located and to relay data between the SPTNs to achieve end-to-end connectivity.

Present gateways, however, have many limitations making the interconnection of networks running different protocols non-transparent, if the interconnection is even possible. For instance, present gateways are transport layer protocol-specific. An example of a transport layer protocol-specific gateway is one which is able to interconnect a network running one flavor of OSI with another network running another flavor of OSI. This gateway is not able to interconnect other types of networks, for example a network running TCP/IP and a network running SNA. More detail is given on an OSI gateway in an article entitled "An Approach to CO/CL Internetworking", CO/CL Internetworking Workshop, Jul. 24–26, 1990.

Another problem with present gateways is that a maximum of two networks may be interconnected, i.e., one gateway being used between the two interconnected networks. No additional networks may be added so that one continuous heterogeneous network may be formed.

Further, with current gateway solutions, all nodes in an SPTN must be upgraded to include additional functions and protocols in order to operate with the gateway. This is not feasible in many environments due to the large number of nodes and cost.

There is a need for a transport layer gateway that has a general architecture so that is has no dependencies on the transport protocols being supported by the interconnected networks. Also, there is a requirement for such a gateway to support connectivity across multiple SPTNs. This gateway should also support existing nodes running existing protocols that cannot be upgraded to include new functions.

SUMMARY OF THE INVENTION

A multiprotocol transport networking (MPTN) gateway provides transparent interconnection of two or more SPTNs running different transport layer protocols to form an integrated heterogeneous MPTN. The MPTN gateway of the present invention has no dependencies on the particular transport protocols running on the SPTNs being interconnected as it utilizes a common interface (a Gateway Services Protocol Boundary (GSPB)) between the SPTN transport protocols and the gateway components. The MPTN gateway supports connections between end systems across multiple intermediate networks. The MPTN gateway provides automatic routing based on dynamic participation in the routing protocols of the interconnected SPTNs so that any number of gateways may be interconnected and in any topology desired. As the MPTN gateway has a general architecture and acquires routing information automatically, it supports not only other MPTN nodes and gateways but also non-MPTN nodes and gateways.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 3 depicts the basic format of a basic link unit (BLU) which is received by the MPTN gateway of the present invention from a native node.

FIG. 4 depicts the basic format of a BLU which is received by the MPTN gateway of the present invention from an MPTN node.

DETAILED DESCRIPTION OF THE PREFERRED EMBODIMENT

Figure 1:
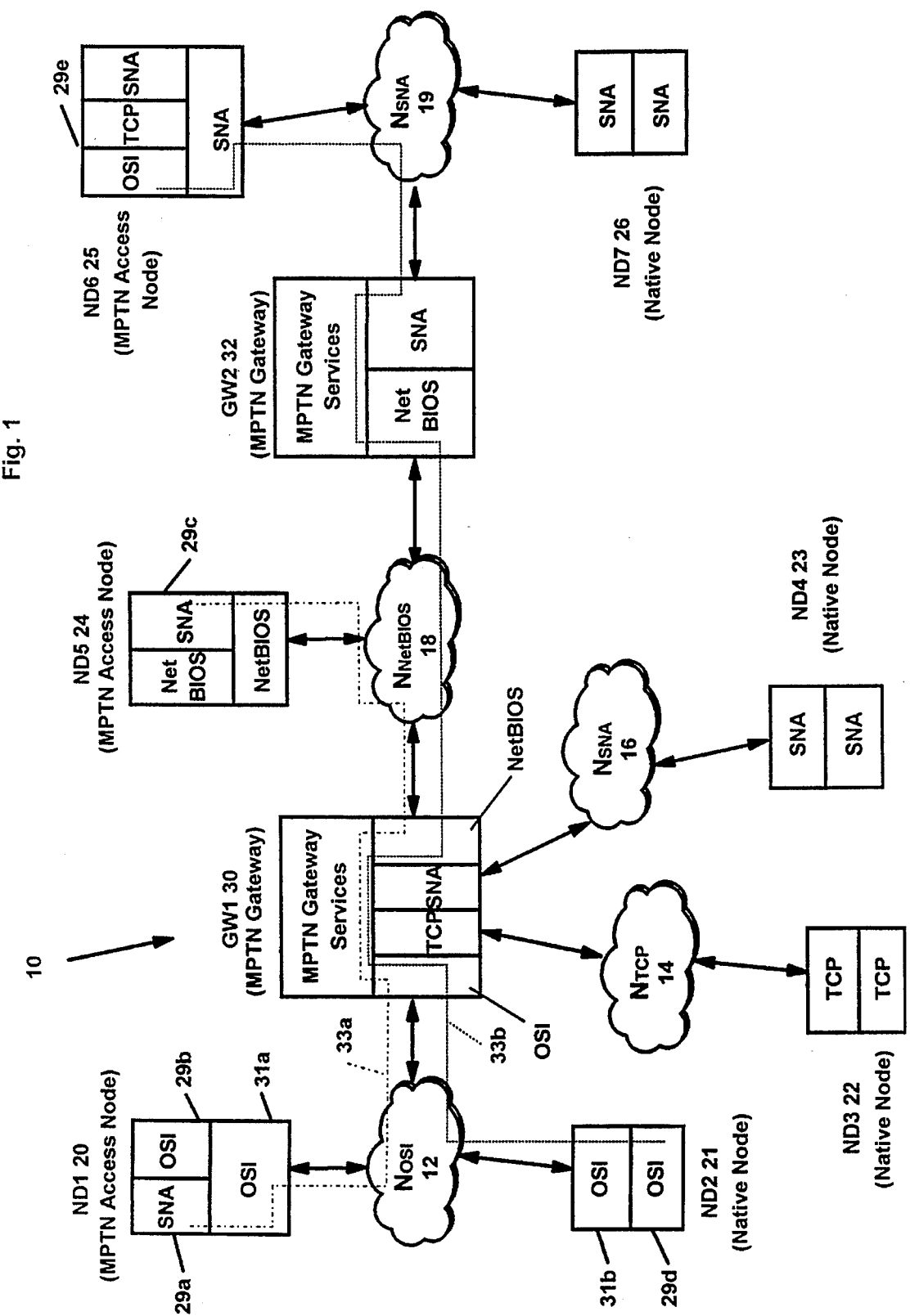
FIG. 1 is a diagram illustrating a multiprotocol transport network (MPTN) consisting of a number of single protocol transport networks (SPTNs) interconnected by MPTN gateways of the present invention.

FIG. 1 is a high-level block diagram of a multiprotocol transport network (MPTN) 10 consisting of five independent single protocol transport networks (SPTNs): an OSI SPTN ($N_{OSI}$ 12), a TCP/IP SPTN ($N_{TCP}$ 14), an SNA SPTN ($N_{SNA}$ 16), a NetBIOS SPTN ($N_{NetBIOS}$ 18), and a second SNA SPTN ($N_{SNA}$ 19). Each SPTN implements a different communication protocol. In particular, in this example, $N_{OSI}$ 12 implements the OSI communication protocol stack, $N_{TCP}$ 14 operates under the TCP/IP protocol, $N_{SNA}$ 16 operates using the SNA communication protocol, and so forth.

Each of the SPTNs has nodes connected thereto. In particular, $N_{OSI}$ 12 has nodes ND1 20 and ND2 21, $N_{TCP}$ 14 has node ND3 22, $N_{SNA}$ 16 has node ND4 23, $N_{NetBIOS}$ 18 has node ND5 24 and $N_{SNA}$ 19 has nodes ND6 25 and ND7 26. For simplicity, each SPTN is shown having only one or two nodes but in reality can have any number of nodes.

Some of these nodes are MPTN access nodes while others are non-MPTN access nodes or native nodes. MPTN access nodes are discussed in great detail in U.S. Pat. No. 5,224,098 and copending application Ser. No. 07/915,969. In the figure, there are three MPTN Access Nodes, ND1 20, ND5 24 and ND6 25. For the purposes of this specification, an MPTN access node is an end node which allows a first transport user (29a, for example) conforming to a particular protocol interface definition, SNA, in this example, to use a transport provider (31a) conforming to a different protocol interface definition, OSI, for conveying information over an MPTN to another transport user (29c) conforming to the first transport user's protocol interface definition (SNA). This communication may be over any number of SPTNs and protocols and is shown in FIG. 1 as dashed line 33a. As can be seen, the communication between $N_{OSI}$ and $N_{NetBIOS}$ is conveyed by an MPTN gateway (GW1 30) which will be discussed in further detail below.

Similarly, some of the nodes are non-MPTN nodes, or native nodes. In the figure, there are four native nodes, ND2 21, ND3 22, ND4 23 and ND7 26. A native node for the purposes of this specification is a node having a transport user 29d which conforms to the same protocol interface definition (OSI, in this example) as its transport provider (31b). Communication between a transport user 29d of a native node ND2 21 and another transport user 29e of an MPTN Access Node ND6 25 is shown by dashed line 33b. The vast majority of presently installed nodes in today's networks are native nodes.

Interconnecting the SPTNs $N_{OSI}$ 12, $N_{TCP}$ 14, $N_{SNA}$ 16, $N_{NetBIOS}$ 18, and $N_{SNA}$ 19 are MPTN gateways (GW1 30 and GW2 32) of the present invention. The MPTN gateway of the present invention has no dependencies on the transport protocols being connected, is able to concatenate two or more SPTNs to form the end-to-end connection, provides automatic routing based upon dynamic participation in the routing protocols of the concatenated SPTNs, and supports both MPTN and native nodes.

Figure 2:
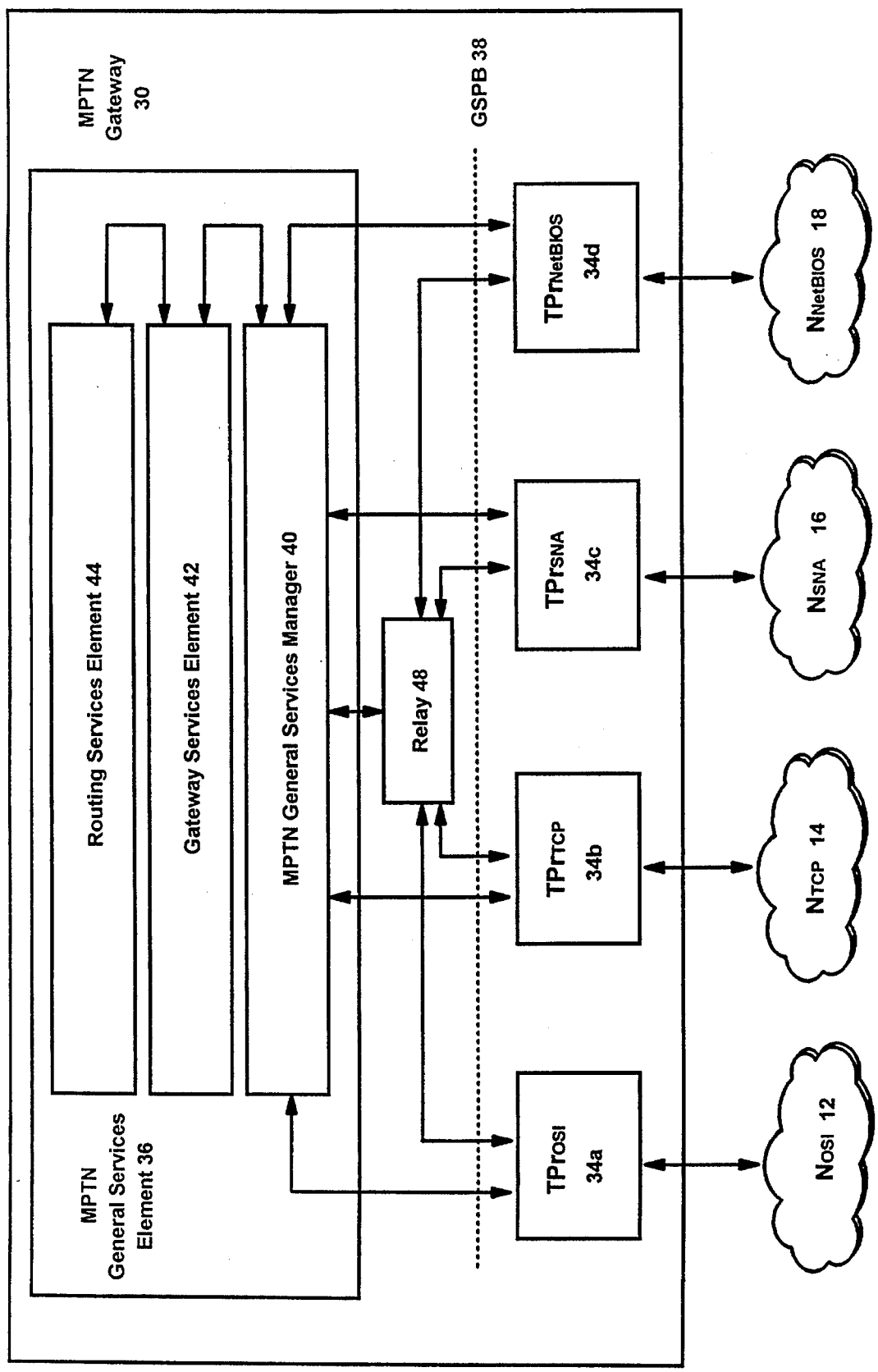
FIG. 2 depicts the MPTN gateway of the present invention in block diagram form.

FIG. 2 illustrates the MPTN Gateway 30 of the present invention in block diagram form connected to SPTNs $N_{OSI}$ 12, $N_{TCP}$ 14, $N_{SNA}$ 16 and $N_{NetBIOS}$ 18. Gateway 30 consists of a plurality of Transport Providers $TPr_{OSI}$ 34a, $TPr_{TCP}$ 34b, $TPr_{SNA}$ 34c and $TPr_{NetBIOS}$ 34d. These Transport Providers define the transport protocols that are actually implemented when data is exchanged between nodes (or gateways) on one SPTN, plus new MPTN protocols (or deltas) to support non-MPTN nodes. In this example, $TPr_{OSI}$ implements the TCP protocol plus deltas, and so forth. Each of the Transport Providers performs all of the transport provider-specific functions in the MPTN Gateway. Only four Transport Providers are shown although any number of providers may be implemented in Gateway 30.

MPTN Gateway 30 further consists of an MPTN General Services Element 36 which is logically connected to each of the Transport Providers. MPTN General Services Element 36 provides various services for the Gateway 30, none of which are transport protocol-specific. MPTN General Services Element 36 is separated from the Transport Providers by a Gateway Services Protocol Boundary (GSPB) 38 which defines the interface between the Transport Providers 34a, 34b, 34c, and 34d and the MPTN General Services Element 36. Above the GSPB, no transport protocol-specific functions occur.

The use of the GSPB is important for a number of reasons. First, separating the MPTN General Services Element from the specific Transport Providers allows the MPTN General Services Element to be independent from the underlying Transport Providers.

Second, a mapping can be defined from each supported Provider to the GSPB and vice versa. This allows a much easier definition of mappings between supported Transport Providers. Rather than defining the mapping from each supported Transport Provider to each other Transport Provider (an $O(N^2)$ problem), all that is required is to define the mapping from each supported Transport Provider to the general form (an $O(N)$ problem).

Third, enabling a new Transport Provider to be a part of an MPTN gateway is simple. The new Transport Provider merely has to map its transport protocol to the GSPB. This allows a Transport Provider to be installed without requiring changes to the MPTN General Services Element 36.

MPTN General Services Element 36 consists of a number of elements: 1) a Manager 40 for managing the activities within the MPTN General Services Element 36; 2) a Gateway Services Element 42 for relaying datagrams and establishing connections through other gateways; and 3) a Routing Services Element 44 for maintaining an address look-up table for determining the location of a requested end user (such as that defined by the Interdomain Routing Protocol, or IDRP) and for implementing multicast search and verification protocols.

Gateway 30 further consists of a Relay 48 which efficiently relays connections data through the Gateway when a connection is established between two SPTNs.

FIGS. 3 and 4 are graphical representations at a high level of the format of a basic link unit (BLU) which is routed throughout the MPTN 10 between MPTN Access Nodes, MPTN Gateways and Native Nodes. (A more thorough description of message formats can be found in copending application Ser. No. 07/915,969). A BLU, for the purposes of this specification, is a packet of information being conveyed between the SPTNs via the Gateway. The label given to the BLU is dependent upon the transport provider protocol. For instance, if the BLU is being conveyed upon a frame relay network, it is labeled a "frame". Or, if it is being conveyed via an asynchronous transfer mode (ATM) network, it is labeled a "cell". All of these various data units are BLUs for the purposes of this invention.

FIG. 3 illustrates a BLU as it is received at the MPTN Gateway 30 of the present invention from a Native Node, such as ND2 21 of FIG. 1. FIG. 4 illustrates a BLU as it is received at the MPTN Gateway 30 from an MPTN Access Node, such as ND1 20 of FIG. 1. Alternatively, the BLU illustrated in FIG. 4 could be received at an MPTN Access Node from an MPTN Gateway.

As shown in FIG. 3, Native Node BLU includes a Transport Provider-specific header and trailer (TPr Hdr, TPr Tlr, respectively). This header and trailer is used for conveying the BLU through the SPTN as is well known in the art. The Transport Protocol header consists of a number of fields: a Command Type field (Comm Type) for identifying particular BLU type, i.e., whether it is a datagram or a command; a Source Address field (Source Addr) identifying the source transport user; a Destination Address field (Dest Addr) identifying the destination transport user; and a Control field (Ctl) for providing various control functions. Following the Transport Header, a Transport User Payload field (T_User Payload) which holds the data that is to be conveyed between the source and the destination transport users.

As shown in FIG. 4, MPTN BLU, like Native Node BLU, includes a Transport Provider-specific header and trailer. As was noted, this header and trailer is used for conveying the BLU through the SPTN as is well known in the art.

The BLU also includes an MPTN header for providing necessary information to the MPTN Gateway or Access Node. MPTN header consists of a length field (Len) indicating the length of the BLU. It also has a command-type field (Comm) for indicating the type of BLU, i.e., whether the BLU is a command such as Register, Locate or Connect, or whether it is a datagram for forwarding. A routing information field (RI) contains the destination address and the source address of the destination and source transport users. A control information field (Ctl Info) provides various BLU information such as "time to live", segment specification indicating how the BLU should be reassembled if it has been disassembled during conveyance, etc.

The BLU further has a transport user payload (T_User Payload) which holds the data that is to be conveyed between the source and the destination transport users.

Routing in an MPTN environment involving an MPTN Gateway can be broken into three pieces:

1) from the source node to the first MPTN Gateway. If the source node is an MPTN node (such as path 33a (FIG. 1) from ND1 20 to GW1 30), routing from the source to the first MPTN Gateway uses MPTN Protocols. If the source node a native, or non-MPTN node, (such as path 33b (FIG.

1) from ND2 21 to GW1 30) routing to the first MPTN Gateway uses the native protocols of the transport provider.

2) between one or more MPTN Gateways (such as path 33b (FIG. 1) from GW1 30 to GW2 32). Routing between MPTN Gateways always uses MPTN protocols.

3) from the last MPTN Gateway to the destination node (such as path 33b (FIG. 1) from GW2 32 to ND6 25). If the destination node is an MPTN node (such as ND6 25 (FIG. 1)), routing from the last MPTN Gateway to the destination uses MPTN Protocols. Where the destination node is a native, or non-MPTN node, (such as ND7 26 (FIG. 1)), routing from the last MPTN Gateway to the destination uses the native protocols of the transport provider.

In supporting non-MPTN nodes, the MPTN gateway must support transport providers that use both search based and routing-table based routing. With search based transport providers, the route from the source to the destination is not known at the time the connection request is made (or datagram is sent). A search is conducted to find where the destination is located, and then the route to the destination is calculated. Transport providers that use search based routing include protocols for searching for the requested destination and calculating the best route once the destination is found. Examples of search based transport providers include NetBIOS and SNA.

With a routing table based protocol, the route to the destination is known before the connection request is made (or datagram sent). When a connection request is made (or datagram sent), the routing table in the node points to the "next hop" along the path in routing the request to the destination. Transport providers that use a routing table based protocol include routing protocols for building the "next hop" routing tables and for maintaining the routing tables. Examples of routing table based transport providers include OSI and TCP/IP.

Figure 5:
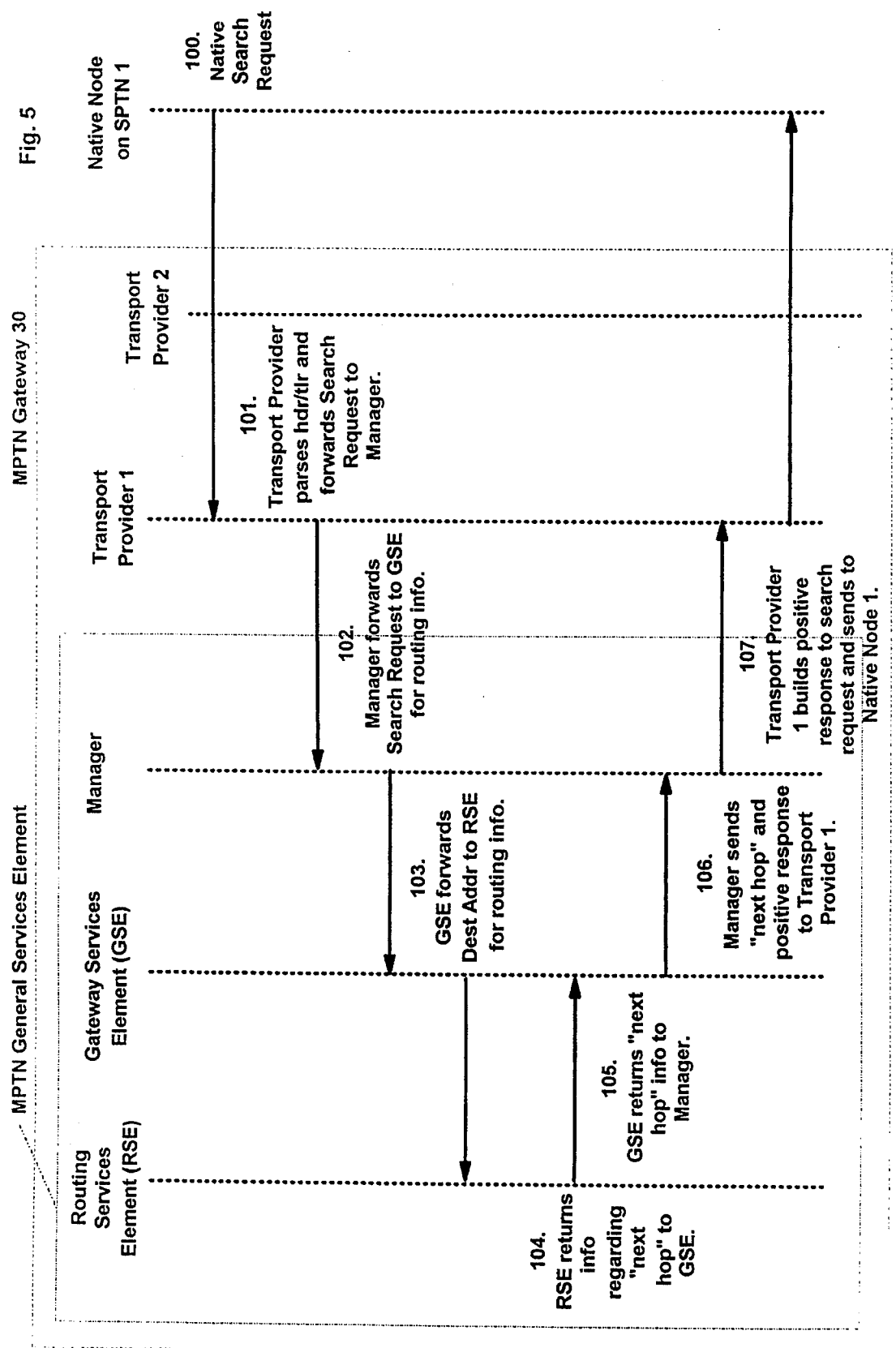
FIG. 5 illustrates the flow of messages and other information exchanged between a native node on an SPTN and the various elements of the MPTN gateway when the native node issues a native search request.
Figure 5A:
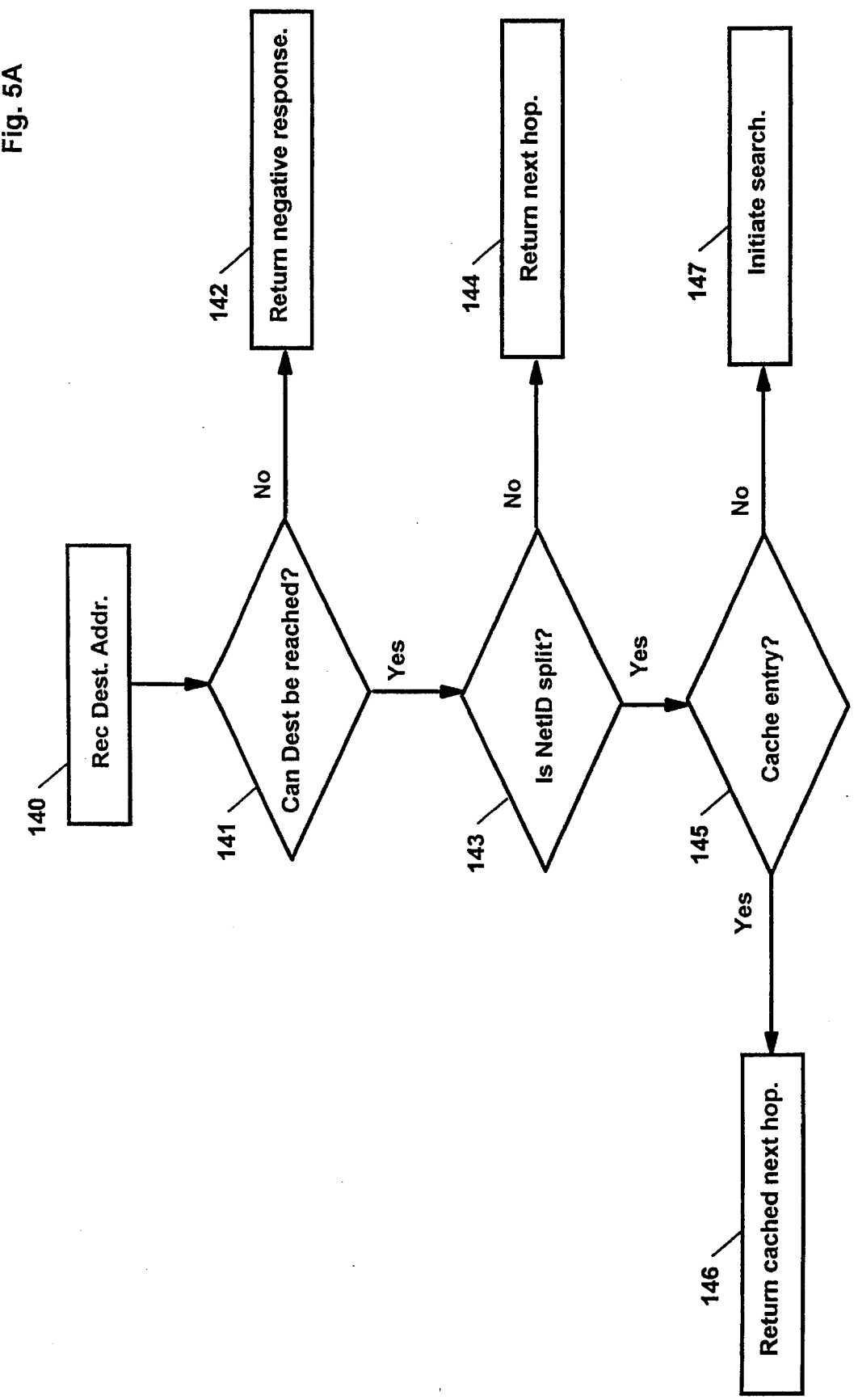
FIG. 5A illustrates, in flow chart form, the procedure followed by the Routing Services Element when routing information is requested.

To support transport providers that use a search based protocol, the MPTN Gateway must participate in the search and route calculation protocols. This involves a number of changes, or deltas, to the transport provider. This is shown in FIG. 5 where a native search request is received by MPTN Gateway 30 from a native node on SPTN 1 at 100. At 101, Transport Provider 1 parses the transport protocol-specific header and determines from the destination address field whether the search request must be forwarded to the MPTN network. If the search is to be forwarded, the transport provider will pass the search request across the GSPB to the Manager. At 102, the Manager determines that it is a search request, and forwards the request to Gateway Services. At 103, Gateway Services forwards the identification of the destination to the Routing Service Element. At 104, Routing Services Element returns the address of the "next hop" to Gateway Services Element. In order to determine the address of the next hop, the Routing Services Element must perform a number of steps. This is shown in FIG. 5A. At 140, the Routing Services Element receives the destination address from the Gateway Services Element. At 141, the Routing Services Element determines whether the destination can be reached by searching its routing tables for the NetId of the destination address. If not, at 142, the Routing Services Element returns a negative response to the requesting native node. If so, at 143, the Routing Services Element determines whether the NetId of the destination address is a split NetId (i.e., the network is split into two or more disjoint SPTNs and the destination could be in one of several SPTNs). If not, at 144, the Routing Services Element returns the next hop to the requesting native node. If it is a split NetId, at 145, the Routing Services Element determines whether there is a cache entry for the NetId of the destination address. If so, at 146, the Routing Services Element returns the cached next hop value to the requesting native node. If not, at 147, the Routing Services Element initiates a search of each potential SPTN. This is described in U.S. Pat. No. 5,361,256, entitled "Inter-Domain Multicast Routing". This procedure detailed in FIG. 5A is used whenever the Routing Services Element is requested by the Gateway Services Element for routing information.

Referring again to FIG. 5, once it is determined that the destination can be reached through this MPTN Gateway, General Services Element responds to Transport Provider 1 with the positive search response. This is shown by steps 104–106. At 107, Transport Provider 1 then responds to the original search/verification request, stating that the requested destination is located on this MPTN Gateway. The MPTN Gateway will subsequently receive a native connection request (or datagram). This is described below in conjunction with FIG. 9.

Figure 6A:
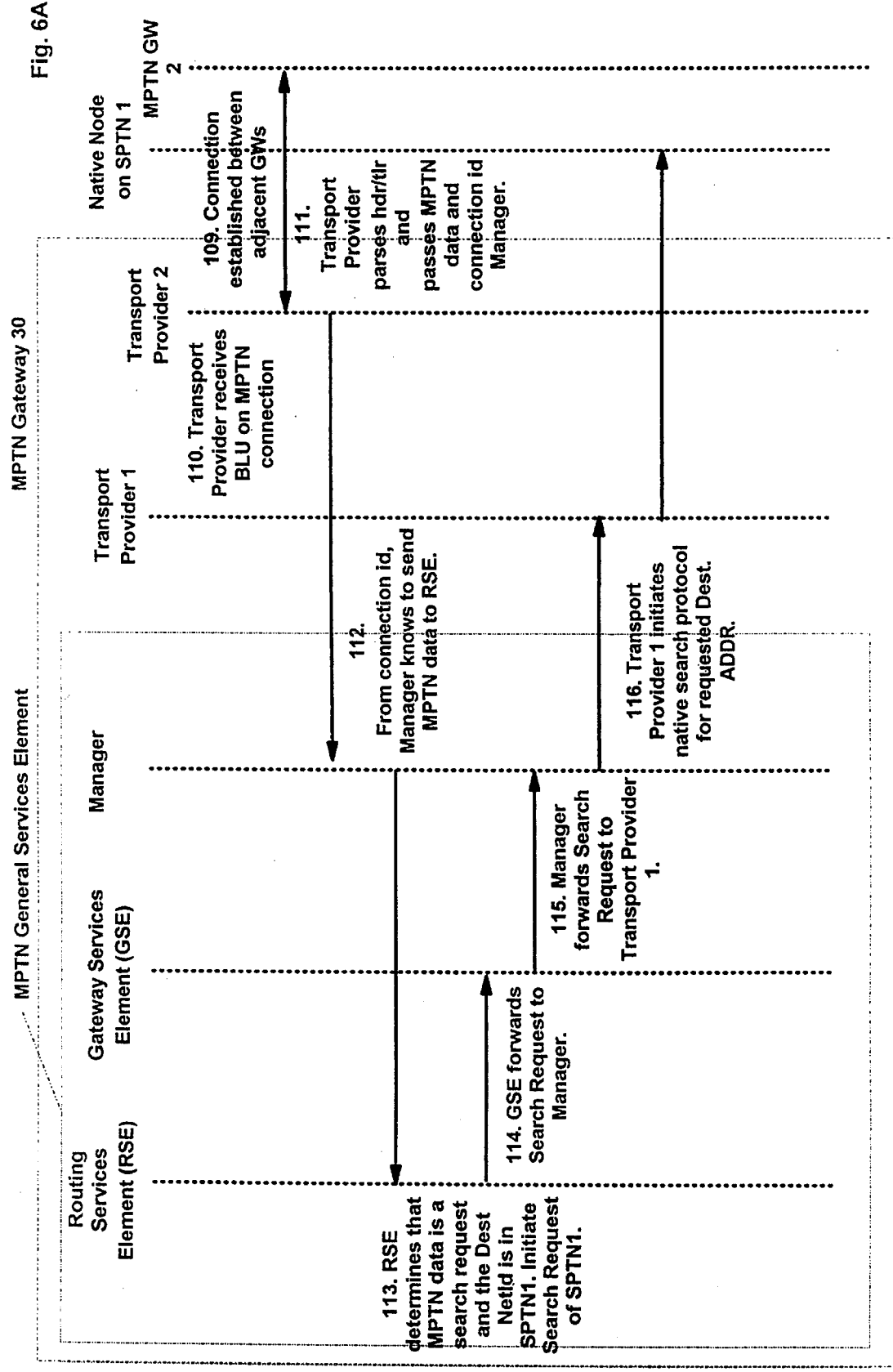
FIGS. 6A and 6B illustrate the flow of messages and other information exchanged between an MPTN gateway, a native node on an SPTN and the various elements of the MPTN gateway when the MPTN gateway issues an MPTN search request.
Figure 6B:
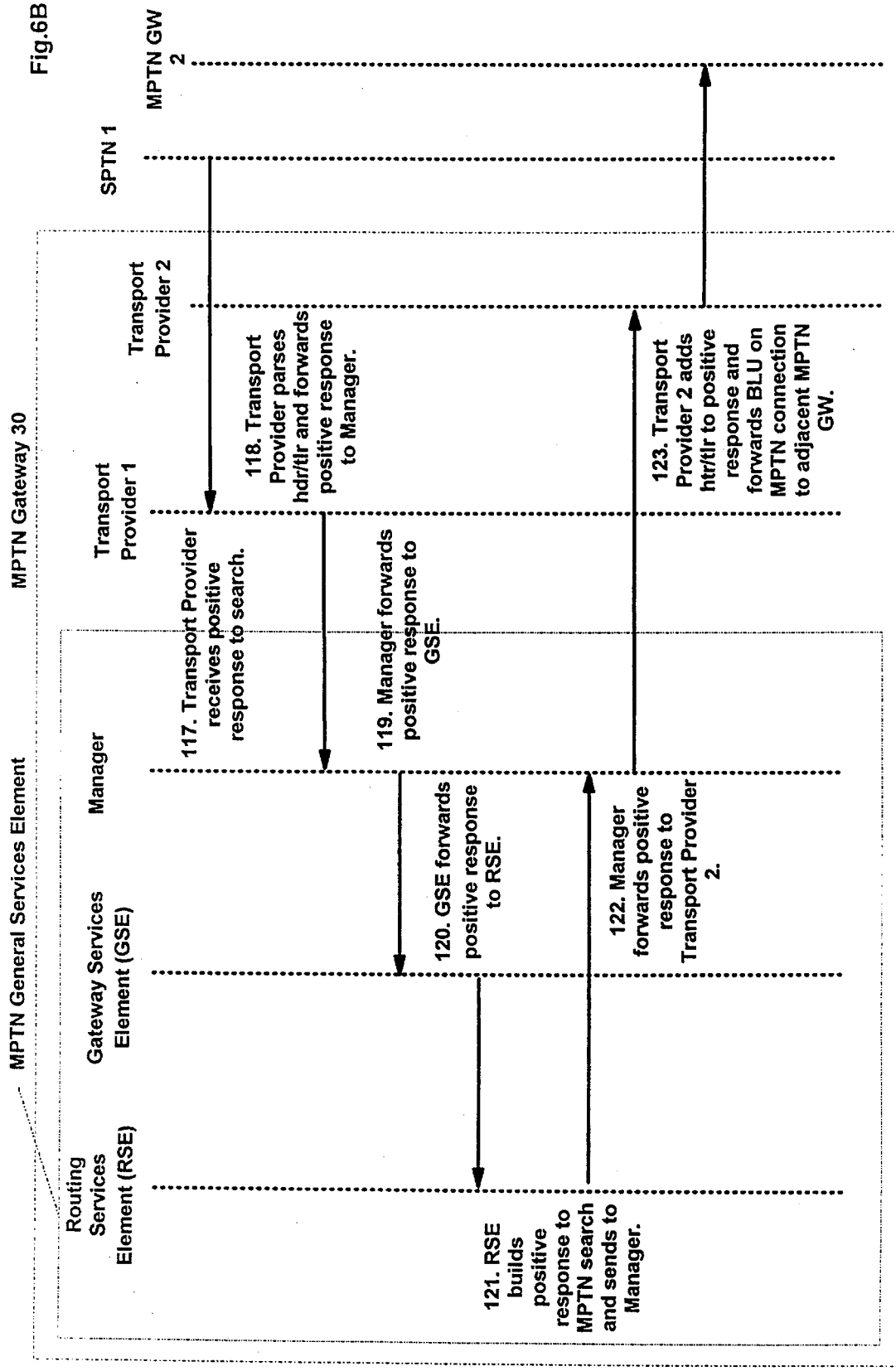

FIGS. 6A and 6B illustrate the message flows when an MPTN search is received from another MPTN Gateway (MPTN GW2). At 109, a connection is already established between the two MPTN Gateways and, at 110, Transport Provider 2 receives a BLU (representing the MPTN search request) from MPTN GW2. At 111, Transport Provider 2 parses the header and trailer and forwards the MPTN data and connection ID to the Manager. Based upon the connection ID, the Manager, at 112, forwards the MPTN search request to the Routing Services Element. At 113, the Routing Services Element determines that it is an MPTN search request and that the Destination NetId is in SPTN1 (to which MPTN GW1 is providing access). Routing Services Element initiates a search request of SPTN1 at 113. At 114, the Gateway Services Element forwards the request to the Manager which, in turn, forwards the request to the Transport Provider 1, at 115. At 116, Transport Provider 1 initiates the native search protocol for the requested destination address.

As shown on FIG. 6B, at 117, Transport Provider 1 receives a positive response to search from SPTN1. At 118, Transport Provider 1 parses the header/trailer and forwards the positive response to the Routing Services Element (via Manager, at 119, and Gateway Services Element, at 120). The Routing Services Element, at 121, builds a positive response to the MPTN search and sends to the Manager which forwards the positive response to Transport Provider 2 at 122. At 123, Transport Provider 2 forwards the positive response to the requesting MPTN GW.

Where the MPTN search request needs to be forwarded to another MPTN Gateway, Gateway Services Element will forward the MPTN search request and next hop Gateway address to Manager, which will forward the search request to the next MPTN Gateway.

To support transport providers that use a routing table based protocols, the MPTN Gateway must participate in the routing protocols that build and maintain the transport provider routing tables. This involves a number of changes, or deltas, to the transport provider. The method of building transport provider routing tables is shown in FIG. 7 while the advertising of transport provider information is shown in FIG. 8.

Figure 7:
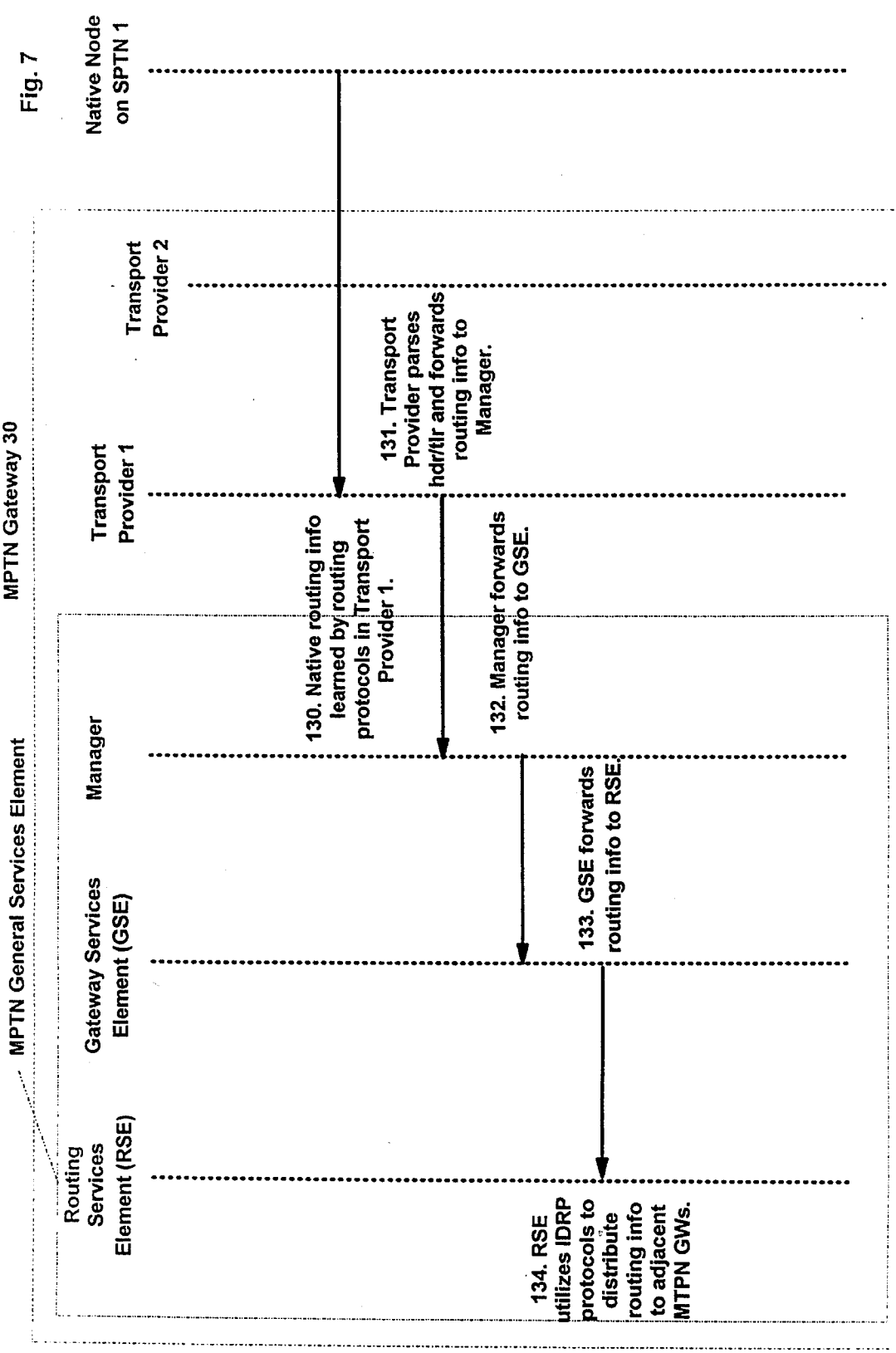
FIG. 7 illustrates the flow of messages and other information exchanged between a native node on an SPTN and the various elements of the MPTN gateway when the native node is advertising routing information to the MPTN Gateway.

In FIG. 7, at 130, Transport Provider 1 learns of native routing information and forwards this information to the Manager. At 131, 132 and 133, Transport Provider 1, Manager and Gateway Services Element, respectively, forwards this information to the Routing Services Element. At 134, the Routing Services Element utilizes IDRP protocols to distribute this routing information to adjacent MPTN Gateways.

Figure 8:
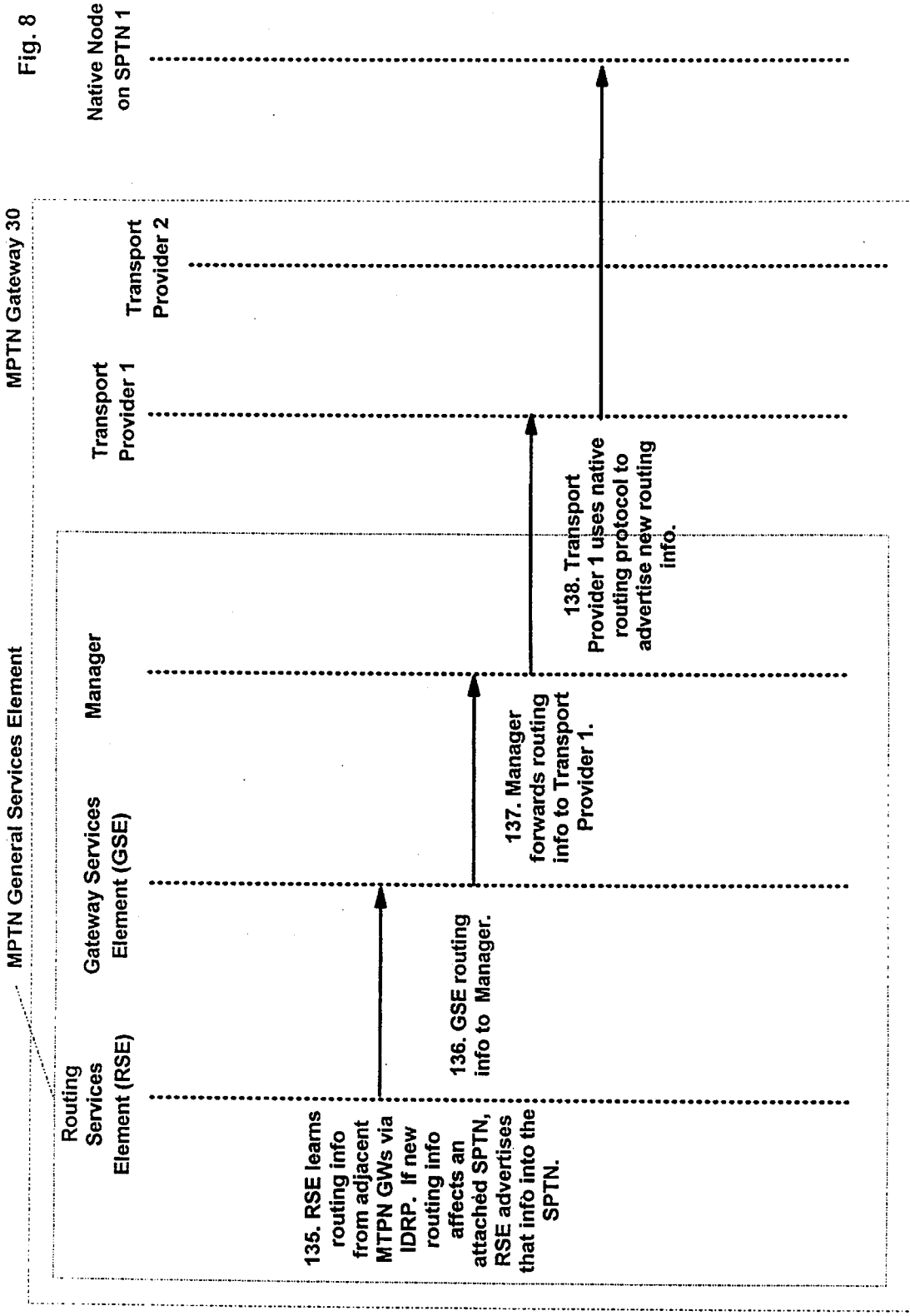
FIG. 8 illustrates the flow of messages and other information exchanged between a native node on an SPTN and the various elements of the MPTN gateway when the MPTN gateway is advertising routing information to the native node.

FIG. 8 illustrates the message flows when MPTN Gateway 30 receives routing information from an adjacent MPTN Gateway. In general, when the MPTN Gateway receives new routing information (via the IDRP protocols), Routing Services Element checks the protocol type of the new routing information to see if it is the same type as any of the SPTNs this Gateway supports. If they do match, the new routing information will be passed across the GSPB into any SPTN that has the same transport protocol type. This process of forwarding MPTN routing information into an SPTN is referred to as advertising. The transport provider then takes this routing information and propagates it through the SPTN using the native routing protocol of that transport provider. Subsequent native connect requests (or datagrams) whose destination routing information were advertised this way, will be routed to the MPTN Gateway. The transport provider will receive the connection request (or datagram) and will pass it across GSPB. This is described in FIG. 9. Using the method described above the MPTN Gateway provides maximum possible connectivity to native (non-MPTN) nodes that use routing-based protocols.

The specific message flows for FIG. 8 are as follows. At 135, the Routing Services Element learns the new routing information and determines that it affects an attached SPTN. The Routing Services Element advertises that information into the affected SPTN. At 136 and 137, the Gateway Services Element and the Manager respectively forward this information to Transport Provider 1. At 138, Transport Provider 1 uses native routing protocols to advertise the new routing information.

Figure 9:
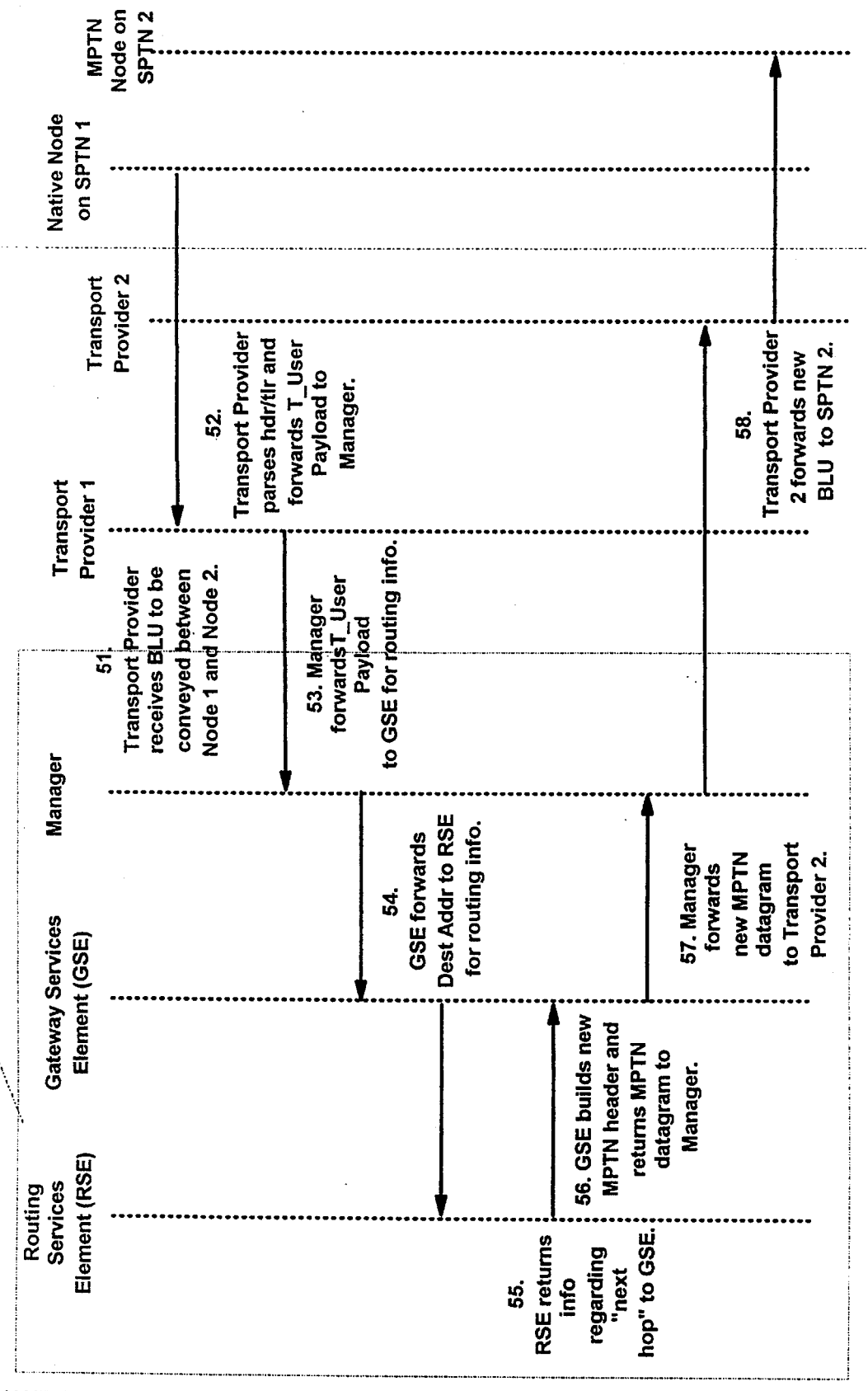
FIG. 9 illustrates the flow of messages and other information exchanged between nodes on the SPTNs and the various elements of the MPTN gateway during the conveyance of a datagram between a Native Node on one SPTN and another node on another SPTN.

FIG. 9 illustrates the operation of Gateway GW1 30 (FIG. 2) where a BLU in the form of a datagram, i.e., a connectionless data packet, is to be conveyed between a Native Node on SPTN 1 to a node (Node 2) on SPTN 2. The path from Node 1 to Node 2 traverses Gateway 30. Node 2 could, alternatively, be a gateway for interconnection to another SPTN (i.e., SPTN 3). In the figure, the arrows indicate the direction of the flow of messages and the corresponding Native Node BLU (of the form shown in FIG. 3) as it is processed. At 51, the particular Transport Provider receives the BLU from the Native Node on SPTN 1 (to be conveyed to Node 2 on SPTN 2), parses the transport protocol-specific header (and trailer, if any) and determines from the destination address field that Node 2 is not located in SPTN 1 and needs to be forwarded to another SPTN. The Transport Provider forwards T_User Payload to the Manager at 52 with parameters indicating to the Manager the transport user destination and the source addresses, required quality of service, user characteristics, and indication that it is a datagram to be forwarded. The Manager forwards the parameters and the T_User Payload to the Gateway Services Element at 53 in order to obtain routing information. Gateway Services Element forwards the identification of the destination user to the Routing Services Element at 54. Routing Services Element determines, from its look-up table (as illustrated in FIG. 5A discussed above), where the destination user is located and returns, at 55, to the Gateway Services Element the "next hop" thereby identifying the particular transport provider address to which the datagram needs to be forwarded, Transport Provider 2, in this example. At 56, the Gateway Services Element builds an MPTN header to the T_User Payload and forwards the resulting MPTN datagram to the Manager. At 57, Manager forwards the new MPTN datagram to Transport Provider 2 along with the corresponding parameters to indicate to the Transport Provider the transport provider source and destination addresses of the "next hop", required quality of service, user characteristics, and indication that it is a datagram for forwarding. The Transport Provider adds the transport protocol-specific header and trailer and transmits the resulting BLU onto SPTN 2 at 58.

Figure 10:
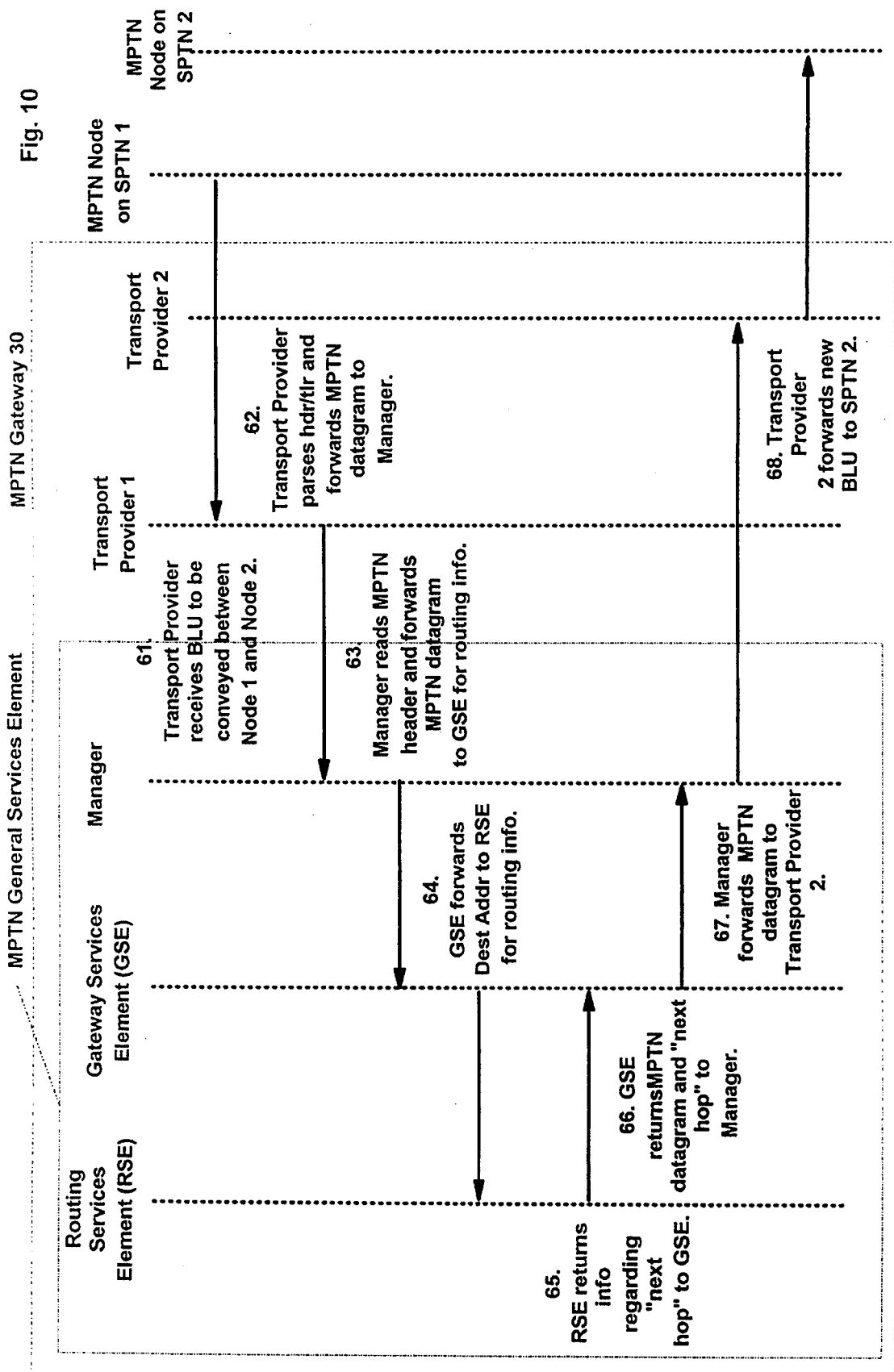
FIG. 10 illustrates the flow of messages and other information exchanged between nodes on the SPTNs and the various elements of the MPTN gateway during the conveyance of a datagram between an MPTN node on one SPTN and another node on another SPTN.

FIG. 10 illustrates the operation of Gateway 30 where a BLU in the form of a datagram is to be conveyed between an MPTN Node on SPTN 1 to an MPTN node on SPTN 2. The path from Node 1 to Node 2 traverses Gateway 30. At 61, the particular Transport Provider receives the BLU from the MPπN Node on SPTN 1, parses the transport protocol-specific header (and trailer, if any) and determines from the source and destination address fields that the datagram is addressed to the well-known MPTN port on Gateway 30. As is known in the industry, a well-known port is a local address that is reserved for a specific service. Only MPTN datagrams will be addressed to this well-known port, thus the Transport Provider knows to forward the MPTN datagram to the Manager. The Transport Provider forwards the MPTN datagram (which includes the MPTN header and the T_User Payload or user datagram), and parameters to the Manager at 62. From the transport user addresses in the MPTN header, the Manager determines that it is a MPTN datagram for forwarding to another SPTN and forwards the BLU to the Gateway Services Element for routing information at 63. Gateway Services Element forwards the identification of the destination user to the Routing Services Element at 64. Routing Services Element determines, from its look-up table (as described in FIG. 5A and accompanying text), where the destination user is located and returns, at 65, to the Gateway Services Element the "next hop" thereby identifying the particular transport provider address to which the MPTN datagram needs to be forwarded. At 66, the Gateway Services Element forwards the MPTN datagram back to the Manager. Manager forwards the MPTN datagram to Transport Provider 2 at 67, along with the corresponding parameters to indicate to the Transport Provider the source and destination transport provider addresses of the next hop and required quality of service. The Transport Provider adds the transport protocol-specific header and trailer and transmits the BLU onto SPTN 2 at 68.

Figure 11A:
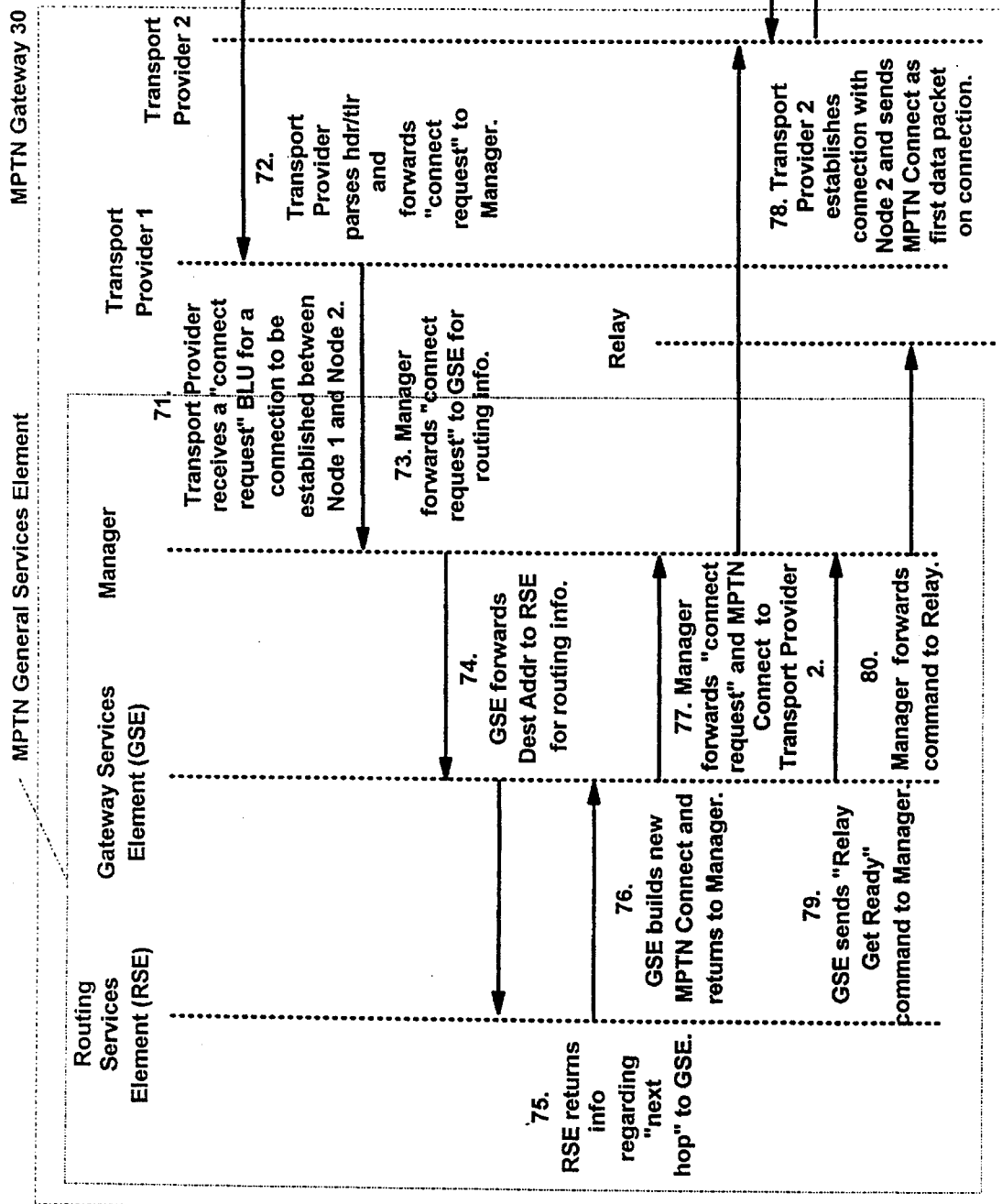
FIGS. 11a and 11b illustrate the flow of messages and other information exchanged between nodes on the SPTNs and the various elements of the MPTN gateway during the establishment of a connection between a Native Node on one SPTN and another node on another SPTN.
Figure 11B:
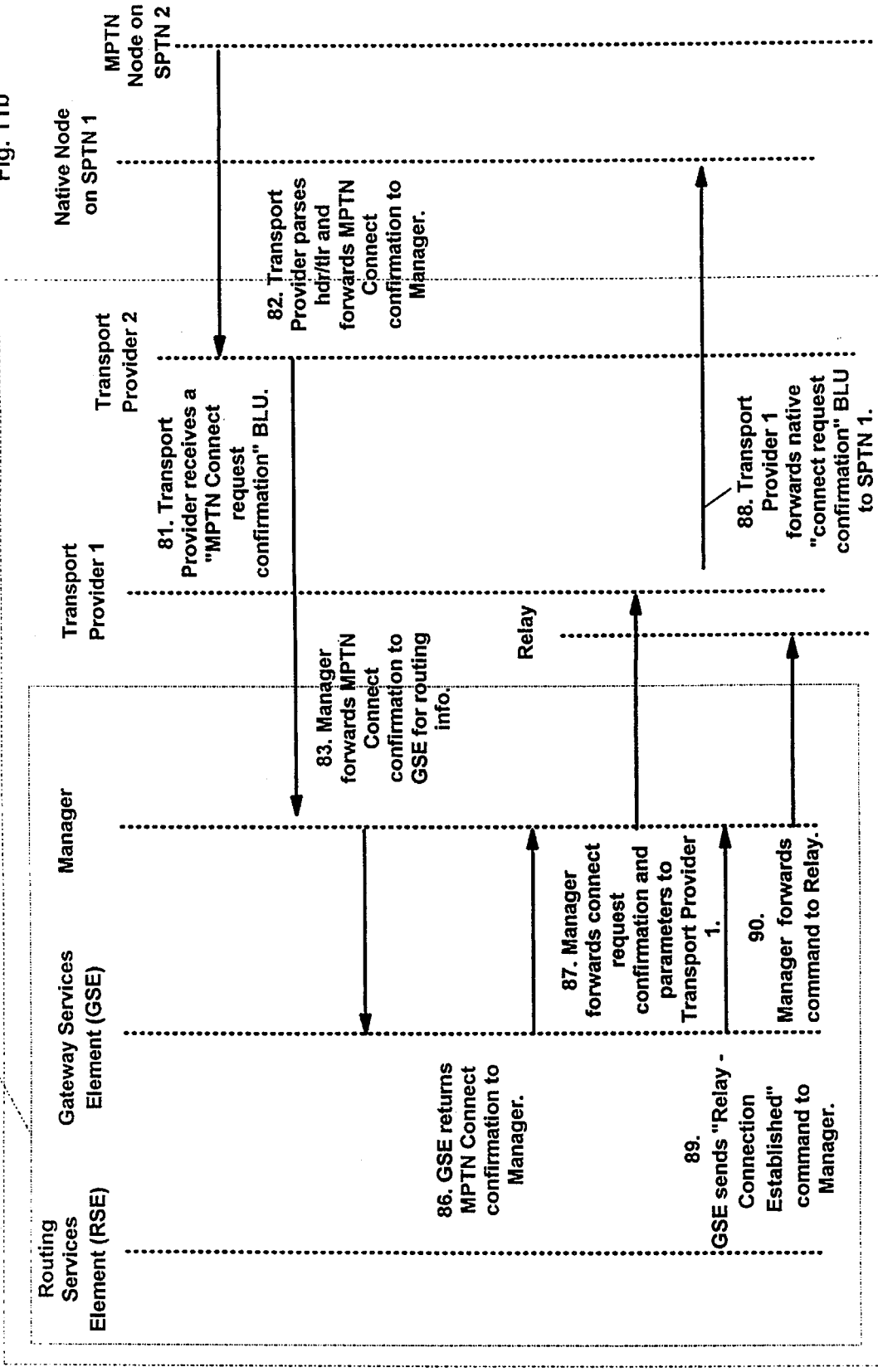

FIGS. 11a and 11b illustrate the operation of Gateway 30 where a "connect" request BLU is received from a Native Node on SPTN 1 requesting to be connected to an MPTN Node on SPTN 2. The path from Node 1 to Node 2 traverses Gateway 30. In FIG. 11a, at 71, the particular Transport Provider receives the BLU from the Native Node on SPTN 1, parses the transport protocol-specific header (and trailer, if any), recognizes from the "Command Type" field that it is a "connect request" from the Native Node and determines from the destination address field that the connect request needs to be forwarded to an MPTN Gateway. The Transport Provider forwards the remaining portion of the BLU which includes the T_User Payload to the Manager at 72 along with parameters giving the source and destination user addresses, required quality of service transport characteristics and a "connect request" parameter. The Manager forwards the parameters to the Gateway Services Element to obtain routing information and to establish the connection to Node 2 at 73. Gateway Services Element forwards the identification of the destination user to the Routing Services Element at 74. Routing Services Element determines, from its look-up table (FIG. 5A and accompanying text) and, when necessary, initiates a search of the MPTN network, where the destination user is located and returns, at 75, to the Gateway Services Element the "next hop" thereby identifying the particular transport provider address to which the "connect request" needs to be forwarded. At 76, the Gateway Services Element builds an MPTN Connect which includes the T_User Payload and forwards the resulting "connect request" to the Manager. Manager forwards the connect request to the Transport Provider 2 at 77, along with the corresponding parameters to indicate to the Transport Provider the source and destination transport provider addresses of the next hop, required quality of service, and MPTN Connect. The Transport Provider establishes a connection with the MPTN node on SPTN 2 and sends the MPTN Connect (with transport specific header and trailer) as the first data packet on the connection at 78. At 79, the Gateway Services Element sends a message, "Relay Get Ready", to the Manager, for forwarding to the Relay, at 80, to prepare for a connection.

In order for a connection to be established, an "end-to-end" confirmation must be established so that each "hop" along the connection path is available for establishing the connection. In other words, the "connect request" BLU is forwarded throughout the MPTN to all of the intermediary nodes so that each is prepared for the connection. It is not until a "connect request confirmation" is received by the originating node that the MPTN connection is considered to be established.

As shown in FIG. 11b, at 81, the "MPTN Connect request confirmation" is received at Transport Provider 2 from Node 2 on SPTN 2. This "MPTN Connect request confirmation" indicates to the Gateway that the connection path is ready for user data exchange. As with all BLUs, the transport-specific header and trailer are parsed, and the remaining MPTN Connect confirmation(with parameters) is forwarded to the Manager for processing. The Manager forwards this to the Gateway Services Element which is responsible for the connection establishment. This responsibility includes confirming the connection to the originating node, keeping the state of the MPTN connection, and preparing the Relay for the connection. The Gateway Services Element forwards the resulting "connect request confirmation" BLU to Manager. The Manager knows that the original incoming connection request was a native request (FIG. 11a) so the Manager parses the MPTN Connect confirmation to get the needed information, including source and destination transport user addresses, required quality of service, and a connect request confirmation parameter. The Manager forwards this to Transport Provider 1 at 87, along with the corresponding parameters. The Transport Provider adds the transport protocol-specific header and trailer and transmits the native "connect request confirmation" BLU onto SPTN 1 at 88. At 89, the Gateway Services Element sends a message, "Relay—Connection Established", to the Manager, for forwarding to the Relay, at 90, to indicate that the connection has been established. At this point, the connection is established and any BLUs received at Transport Provider 1 from this connection will be forwarded directly to the Relay for forwarding to Transport Provider 2.

No illustration is given where there is a connection request from an MPTN Node as the method for processing this request is identical to the method described in conjunction with FIGS. 11a and 11b, except that there is additional processing required for the MPTN header which is received with the connection request BLU. The processing of the MPTN header is described in conjunction with FIG. 10.

Thus, it can be seen that the MPTN Gateway of the present invention provides transparent interconnection of two or more SPTNs running different transport layer protocols. The primary function of the gateway is to connect individual SPTNs to form an integrated heterogeneous MPTN or internetwork.

What is claimed is:

1. A gateway for being interconnected between a first single protocol transport network SPTN running a first transport provider protocol and a second SPTN running a second transport provider protocol, for receiving from a node connected to said first SPTN a basic link unit BLU having header information conforming to said first protocol, for processing said first protocol BLU to a BLU having header information conforming to said second protocol, and conveying said second protocol BLU to a node connected to said second SPTN, said gateway comprising:

a first SPTN transport provider having means for receiving said first protocol BLU and means for processing said first protocol header information into a general form;

a second SPTN transport provider having means for conveying said second protocol BLU to said second SPTN, and means for processing general form header information into header information conforming to said second protocol; and an element for providing general gateway services for said first and second SPTN transport providers comprising means for receiving general form header information from said first SPTN transport provider, means for processing said received general form header information, means for creating new general form header information and means for building a multiprotocol transport network MPTN header and means for conveying to said second SPTN transport provider said new general form header information and said MPTN header.

2. The gateway defined in claim 1 wherein said first protocol BLU further has a first protocol BLU MPTN header and said general gateway services element further comprises means for receiving said first protocol BLU MPTN header from said first SPTN transport provider, means for processing said first protocol BLU MPTN header, and means for creating new general form header information based upon said received first protocol BLU MPTN header and means for conveying said new general form header information and said first protocol BLU MPTN header to said second SPTN transport provider.

3. The gateway defined in claim 2 wherein said first protocol BLU MPTN header processing means comprises a routing services element for determining the address of said node on said second SPTN based upon information in said first protocol BLU MPTN header.

4. The gateway defined in claim 2 wherein said first SPTN transport provider further has means for determining whether said first protocol BLU is an MPTN BLU.

5. The gateway defined in claim 1 wherein said first SPTN transport provider further comprises means for conveying said first protocol BLU to said first SPTN and said first protocol header information processing means comprises means for determining whether said first protocol BLU needs to be conveyed to another SPTN or needs to be conveyed to said first SPTN.

6. The gateway defined in claim 1 wherein said general gateway services element further comprises a routing services element for determining the address of said node on said second SPTN based upon said received general form header information.

7. The gateway defined in claim 1 further comprising, in addition to said first SPTN transport provider and said second SPTN transport provider, a plurality of unique SPTN transport providers, different from said first SPTN transport provider, from said second SPTN transport provider and from each other, each for providing an transport provider to an SPTN running a correspondingly unique transport protocol, each unique SPTN transport provider having means for receiving a BLU having header information conforming to said corresponding unique SPTN protocol, means for processing said unique SPTN protocol header information into general form header information, means for receiving from said general gateway services element and processing general form header information into unique protocol header information and means for conveying a unique protocol BLU to said unique SPTN.

8. The gateway defined in claim 1 wherein said general gateway services element further comprises a gateway services element for relaying datagrams from said first SPTN transport provider to said second SPTN transport provider.

9. The gateway defined in claim 8 wherein said gateway further comprises a relay and said gateway services element establishes connections between said first and second SPTN transport providers utilizing said relay.

10. In a gateway for being interconnected between a first SPTN running a first transport provider protocol and a second SPTN running a second protocol, said gateway comprising first and second transport providers for interfacing with said first and second SPTNs and further comprising a general gateway services element for providing gateway services to said first and second transport providers, a method of conveying a basic link unit BLU from said first SPTN to said second SPTN, said received BLU consisting of header information conforming to said first protocol, said method comprising the steps of:

receiving said BLU from said first SPTN in said first transport provider;

in said first transport provider, processing said header information into a general form understood by said general gateway services element;

conveying to said general gateway services element said general form header information;

in said general gateway services element, building a multiprotocol transport network MPTN header;

in said general gateway services element, creating new general form header information based upon said general form header information;

conveying to said second transport provider said MPTN header and said new general form header information; and in said second transport provider, processing said new general form header information into a header information conforming to said second protocol; and from said second transport provider, conveying, to said second SPTN, a second protocol BLU having said second protocol header information and said MPTN header.

11. The method defined in claim 10 further comprising, before said MPTN header building step, the step of examining said general form destination address and determining an intermediary address and further wherein, in said building step, said MPTN header is based upon said intermediary address.

12. The method defined in claim 11 wherein said BLU received by said first transport provider further consists of a first transport provider MPTN header of a form understood by said general gateway services element and said building step comprises the steps of examining said received first transport provider MPTN header, determining an intermediary address based upon said first transport provider MPTN header, and creating said new general form header information based on said intermediary address.

13. The method defined in claim 10 wherein said gateway further comprises a relay for establishing a connection through said gateway between said first SPTN and said second SPTN and said received BLU further has a command field conforming to said first protocol, said method further comprising the step, after said destination address processing step, of processing said command field into a general form understood by said general services element, and, before said building step, the step of examining said general form command field and, where said command is a CONNECT command, said building step comprises building a different header MPTN header having an MPTN CONNECT command.

14. The method defined in claim 10 wherein said MPTN header building step comprises the step of determining the address of said node on said second SPTN based upon information in said MPTN header.

15. A gateway for being interconnected between a first single protocol transport network SPTN running a first transport provider protocol and a second SPTN running a second transport provider protocol, for receiving from a multiprotocol transport MPTN node connected to said first SPTN a basic link unit BLU having header information conforming to said first protocol and further having MPTN header information, for processing said first protocol BLU to a BLU having header information conforming to said second protocol, and conveying said second protocol BLU to a native node connected to said second SPTN, said gateway comprising:

a first SPTN transport provider having means for receiving said first protocol BLU and means for processing said first protocol header information into a general form;

a second SPTN transport provider having means for conveying said second protocol BLU to said second SPTN, and means for processing general form header information into header information conforming to said second protocol; and an element for providing general gateway services for said first and second SPTN transport providers comprising means for receiving general form header information and said MPTN header information from said first SPTN transport provider, means for processing said received general form header information and said MPTN header information, means for creating new general form header information and means for conveying to said second SPTN transport provider said new general form header information.

16. The gateway defined in claim 15 wherein said general gateway services element further comprises means for conveying to said second SPTN transport provider said MPTN header information.

17. The gateway defined in claim 15 wherein said MPTN header processing means comprises a routing services element for determining the address of said node on said second SPTN based upon information in said MPTN header.

18. The gateway defined in claim 15 wherein said first SPTN transport provider further has means for determining whether said first protocol BLU is an MPTN BLU.

19. The gateway defined in claim 15 wherein said first SPTN transport provider further comprises means for conveying said first protocol BLU to said first SPTN and said first protocol header information processing means comprises means for determining whether said first protocol BLU needs to be conveyed to another SPTN or needs to be conveyed to said first SPTN.

20. The gateway defined in claim 15 wherein said general gateway services element further comprises a routing services element for determining the address of said node on said second SPTN based upon said received general form header information.

21. The gateway defined in claim 15 further comprising, in addition to said first SPTN transport provider and said second SPTN transport provider, a plurality of unique SPTN transport providers, different from said first SPTN transport provider, from said second SPTN transport provider and from each other, each for providing an transport provider to an SPTN running a correspondingly unique transport protocol, each unique SPTN transport provider having means for receiving a BLU having header information conforming to said corresponding unique SPTN protocol, means for processing said unique SPTN protocol header information into general form header information, means for receiving from said general gateway services element and processing general form header information into unique protocol header information and means for conveying a unique protocol BLU to said unique SPTN.

22. The gateway defined in claim 15 wherein said general gateway services element further comprises a gateway services element for relaying datagrams from said first SPTN transport provider to said second SPTN transport provider.

23. The gateway defined in claim 22 wherein said gateway further comprises a relay and said gateway services element establishes connections between said first and second SPTN transport providers utilizing said relay.

24. In a gateway for being interconnected between a first single protocol transport network SPTN running a first transport provider protocol and a second SPTN running a second protocol, said gateway comprising first and second transport providers for interfacing with said first and second SPTNs and further comprising a general gateway services element for providing gateway services to said first and second transport providers, a method of conveying a basic link unit BLU from said first SPTN to said second SPTN, said received BLU consisting of header information conforming to said first protocol and further consisting of multiprotocol transport network MPTN header information, said method comprising the steps of:

receiving said BLU from said first SPTN in said first transport provider;

in said first transport provider, processing said header information into a general form understood by said general gateway services element;

conveying to said general gateway services element said general form header information and said MPTN header information;

in said general gateway services element, processing said MPTN header information;

in said general gateway services element, creating new general form header information based upon said general form header information;

conveying to said second transport provider said new general form header information; and in said second transport provider, processing said new general form header information into a header information conforming to said second protocol; and from said second transport provider, conveying, to said second SPTN, a second protocol BLU having said second protocol header information.

25. The method defined in claim 24 wherein said MPTN header information processing step comprises the steps of examining said received MPTN header, determining an intermediary address based upon said MPTN header, and creating said new general form header information based upon said intermediary address.

26. The method defined in claim 24 wherein said gateway further comprises a relay for establishing a connection through said gateway between said first SPTN and said second SPTN and said MPTN header information further has an MPTN command field, said MPTN header information processing step further comprising the step of examining said MPTN command field and, where said command is an MPTN CONNECT command, said method further comprising the step of building a general form command field having a general form CONNECT command.

27. The method defined in claim 24 wherein said MPTN header processing step comprises the step of determining the address of said node on said second SPTN based upon information in said MPTN header.

\* \* \* \* \*